United States Patent [19]
Fima

[11] Patent Number: 5,826,984
[45] Date of Patent: Oct. 27, 1998

[54] METHOD AND APPARATUS FOR THE OPTICAL MEASUREMENT OF THE TEMPERATURE OF A GASEOUS MIXTURE

[75] Inventor: Henri Fima, Malissard, France

[73] Assignee: Sextant Avionique, Meudon La Foret, France

[21] Appl. No.: 354,132

[22] Filed: Dec. 6, 1994

[30] Foreign Application Priority Data

Dec. 10, 1993 [FR] France .................................. 93 14855

[51] Int. Cl.⁶ .......................... G01K 11/20; G01N 21/64
[52] U.S. Cl. ............................ 374/161; 374/120; 356/43; 250/458.1; 250/459.1
[58] Field of Search .................................. 374/120, 161; 250/458.1, 459.1; 356/43

[56] References Cited

U.S. PATENT DOCUMENTS

| | | |
|---|---|---|
| 4,469,946 | 9/1984 | Tanaka et al. . |
| 4,708,494 | 11/1987 | Kleinerman .............................. 374/161 |
| 4,790,652 | 12/1988 | Uneus et al. ............................... 356/45 |
| 4,819,658 | 4/1989 | Kolodner ................................. 374/161 |
| 4,880,972 | 11/1989 | Brogardh et al. ........................ 374/161 |
| 4,986,654 | 1/1991 | Meijer et al. ............................ 374/161 |
| 5,090,818 | 2/1992 | Kleinerman .............................. 374/161 |
| 5,111,055 | 5/1992 | Fima ..................................... 250/459.1 |
| 5,161,890 | 11/1992 | Fima ....................................... 374/120 |
| 5,459,324 | 10/1995 | Fima ..................................... 250/458.1 |

FOREIGN PATENT DOCUMENTS 0 374822 A1  6/1990  European Pat. Off. .

OTHER PUBLICATIONS

"Time–Resolved Infrared Emission Spectroscopy in High–Enthalpy Supersonic Air Flows", W. R. Rawlins et al., pp. 499–504, Mar. 1993, vol. 31, No. 3.

"Infrared Fluorescence Measurement of Equilibrium and Vibrational Temperatures in Laser–Irradiated Gases", Lawrence Kleinman et al., Journal of Applied Physics, vol. 49, No. 8, pp. 4328–4334.

"Temperature Measurements by Light–Scattering Methods", Normand Laurendeau, Progress in Energy and Combustion Science, vol. 14, No. 2, May 27, 1988, pp. 147–170.

Primary Examiner—Diego F. F. Gutierrez
Attorney, Agent, or Firm—Lowe, Price, LeBlanc & Becker

[57] ABSTRACT

Method and apparatus for the optical determination of the temperature of a gaseous mixture, the method comprising the stages consisting:

of exciting in the infrared range the molecules of a gas of said mixture, from a first vibrational level towards a second vibrational level;

of allowing the rotational relaxation of said molecules between the different rotational sub-levels of said second vibrational level;

of measuring the ratio of the populations of molecules located at two of said rotational sub-levels; and of deducing from said ratio the temperature of the gaseous mixture.

16 Claims, 4 Drawing Sheets

METHOD AND APPARATUS FOR THE OPTICAL MEASUREMENT OF THE TEMPERATURE OF A GASEOUS MIXTURE

TECHNICAL FIELD

The present invention relates to a method and an apparatus for the optical measurement of the temperature of a gaseous mixture.

BACKGROUND OF THE INVENTION

Various optical methods for measuring the temperature of a gaseous mixture have already been proposed in the prior art. Such measurements are based upon the following principles.

Very diagrammatically, an atom may be considered as a number of negatively charged electrons in orbit around a positively charged nucleus. The radii of the orbits are not random. In fact, in order for the trajectory of an electron to be stable, its distance from the nucleus, i.e. the radius of its orbit, must be such that its kinetic moment, the product of its quantity of movement and radius, is in the form of $n \cdot h/2\pi$, where n is a whole number and h is a constant, the so-called Planck's constant.

When an electron is located on a permitted orbit defined in this way, its state is stationary and it radiates no energy. There consequently corresponds to a given orbit an energy which is itself given.

On the other hand, if an electron passes from a permitted orbit of energy $E_1$ to another permitted orbit of energy $E_2$, it undergoes a variation of energy equal to $E_2-E_1$. If $E_1$ is greater than $E_2$, the electron then emits a photon (basic particle of light) of energy $-(E_2-E_1)$ of which the frequency $v_s$ is such that:

$$v_s = -(E_2-E_1)/h \quad (1)$$

Similarly, if $E_1$ is less than $E_2$, the electron then absorbs a photon of frequency $v_s$ such that:

$$v_a = (E_2-E_1)/h \quad (2)$$

The energy of the electrons, and thus of the atoms is thus quantified. It can adopt only certain discrete values and the atom absorbs or emits electromagnetic radiation when its energy passes from one level to another. In the absence of excitation, the atom is at its ground level where its energy is minimal.

Similar processes take place at the molecular level.

A molecule is a number of atoms whereof the electrons ensure cohesion. The energy of a molecule depends, apart from the electronic energy of its constituent atoms, on the displacement energy of the nuclei.

Two types of displacement may be envisaged: on the one hand vibrations, corresponding to variations of distance between the nuclei of the atoms and on the other hand, rotations, in which the molecule rotates about itself.

In this case also the energy levels are also quantified. In fact, from the vibrational point of view, a molecule may be either in its ground state, or in an excited state. The various possible excited states correspond to discrete energy levels, i.e., energy cannot vary continuously. A vibrational transition, i.e. a transition from one energy level to another corresponding to two distinct vibrational states, occurs when the molecule absorbs or emits a photon in the infrared range, i.e., a frequency of the order of $10^{12}$ to $10^{14}$ Hz corresponding to wavelengths of the order of 1 µm to 100 µm.

Similarly, each vibrational energy level is divided into a discrete set of rotational energy sub-levels, i.e., a molecule in a given vibrational state may be in a certain number of different states from the rotational point of view. A rotational transition of the molecule, i.e., the passage of the molecule from one rotational sub-level to another, whilst preserving the same vibrational state, corresponds to the emission or absorption of a photon whereof the frequency is in the radio-frequency or far infrared range, i.e. of the order of $10^6$ to $10^{12}$ hertz, which corresponds to wavelengths varying from approximately 100 meters to approximately 100 micrometers.

As in the case of the electronic energy of an atom, the vibrational and rotational energy of a molecule may vary solely by predetermined quantities corresponding to the jump from one permitted energy level to another permitted energy level. The result is that the frequencies of photons which may be emitted or absorbed by a molecule have clearly determined values, given respectively by the formulae (1) and (2) above.

Corresponding to all the frequencies of the photons able to be emitted by a molecule is a number of emission lines constituting the emission spectrum of the molecule. A number of absorption lines constituting the absorption spectrum of the molecule corresponds similarly to the number of frequencies of the photons able to be absorbed by the molecule.

Lines close to each other may be grouped in bands which correspond to a certain range of frequencies.

Methods for the optical measurement of the temperature of a gaseous mixture are generally based on an excitation by absorption of the photons of a laser beam, of the molecules of one of the constituents of this mixture. The temperature is then obtained by observing the characteristics of the de-excitation process of the molecule, or relaxation, and by linking these characteristics with the temperature and other known physical parameters.

Thus the document U.S. Pat. No. 5,161,890 describes a method for the remote optical measurement of the temperature of the air, in particular in front of an aircraft, in which there are excited, by means of a laser generator, transitions of energy bands of the so-called Schumann-Runge range of molecular oxygen.

A laser useful for these measurements is an argon-fluorine excimer laser capable of being tuned in the ultra-violet range of about a wavelength of 193 nanometers. However, available argon-fluorine lasers cannot be carried on board an aircraft and, in addition, extremely heavy equipment is required to obtain a laser beam at 193 nanometers by the mixing of frequencies.

The present invention obviates these drawbacks.

SUMMARY OF THE INVENTION

According to a first aspect of the present invention, a method is provided for the optical determination of the temperature of a gaseous mixture, particularly atmospheric air, comprising:

exciting in the infrared range the molecules of a gas, particularly methane, of said mixture from a first vibrational level to a second vibrational level;

allowing the rotational relaxation of said molecules between the different rotational sub-levels of said second vibrational level;

measuring the ratio of the populations of molecules located at two of said rotational sub-levels; and deducing from said ratio the temperature of the gaseous mixture.

Advantageously, working in the infrared range allows the use of lighter equipment than that required in the prior art.

Moreover, allowing the relaxation phenomena to distribute the molecules between the different rotational sub-levels of the same vibrational level makes it possible to excite the molecules of gas on a single line. The different populations of the rotational sub-levels at thermal equilibrium are then obtained naturally by simple relaxation due to the molecular collisions.

It will be recalled that "population" denotes the ratio of the number of molecules appearing at a given energetic state to the total number of molecules.

Moreover, as hereafter disclosed, the temperature of the mixture can be determined solely from the ratio of the said populations, this ratio being independent of the density.

Finally, although the concentration of methane in atmospheric air is very low, on the order of $1.7 \times 10^{-6}$, the use of this gas is advantageous, since this concentration remains roughly constant in the troposphere, which is an advantage with respect to other gases such as water vapour.

In an embodiment of the present invention, with a view of measuring the ratio of the populations of molecules located at said two rotational sub-levels, the ratio of the intensities of fluorescence of two lines of the emission spectrum of said gas from said two rotational sub-levels towards two other rotational sub-levels of a third vibrational level is measured.

According to another aspect of the present invention, the temperature of a gaseous mixture, in particular of atmospheric air, is optically determined by a method comprising: measuring the ratio of the intensity of fluorescence of two lines of the emission spectrum of a gas, particularly methane, of said mixture, whereof the molecules have been previously excited in the infrared range at two different energy states;

deducing from this ratio the ratio of the populations of said states; and deducing said temperature from said ratio of populations.

The present invention also relates to an apparatus for the optical measurement of the temperature of a gaseous mixture, which apparatus comprises:

a laser able to excite the molecules of a gas of said mixture in the infrared range from a first to a second vibrational level;

detection means for measuring the intensity of fluorescence of two lines of the emission spectrum of said gas from two rotational sub-levels of said second vibrational level;

and calculation means for determining said temperature from said intensities.

In an embodiment of the present invention, said calculation means are arranged to integrate the detection currents produced in the detection means associated with each of said lines, to calculate the ratio of the charges corresponding to each of said currents and to deduce the temperature of said ratio.

Particular embodiments of the invention, associated with a method for measuring pressure, will now be described as a non-limiting example, referring to the accompanying drawings.

DESCRIPTION OF THE INVENTION

The inventive method for measuring temperature consists essentially of calculating the ratio of the populations of two energy levels of a molecule from the measurement of the ratio of two intensities of fluorescence.

If the populations in question are in thermodynamic equilibrium, the numbers $N_1$ and $N_2$ of molecules at the energies $E_1$ and $E_2$ verify the Boltzmann relationship:

$$\frac{N_2}{N_1} = \frac{g_2}{g_1} e^{\frac{-(E_2-E_1)}{kT}}$$

in which $g_1$ or $g_2$ are the statistical weights of the levels $E_1$ and $E_2$, k is the Boltzmann constant, and T is the absolute temperature. The ratio $N_2/N_1$ is thus all the more sensitive to temperature the greater the energy difference $|E_2-E_1|$ before kT.

In order to carry out the measurement, one then chooses as energy levels two rotational sub-levels of the upper vibrational level of the transition used (excited level). The measurement requires solely a single excitation frequency and leads to a calculation of the temperature independent of the density.

Figure 1:
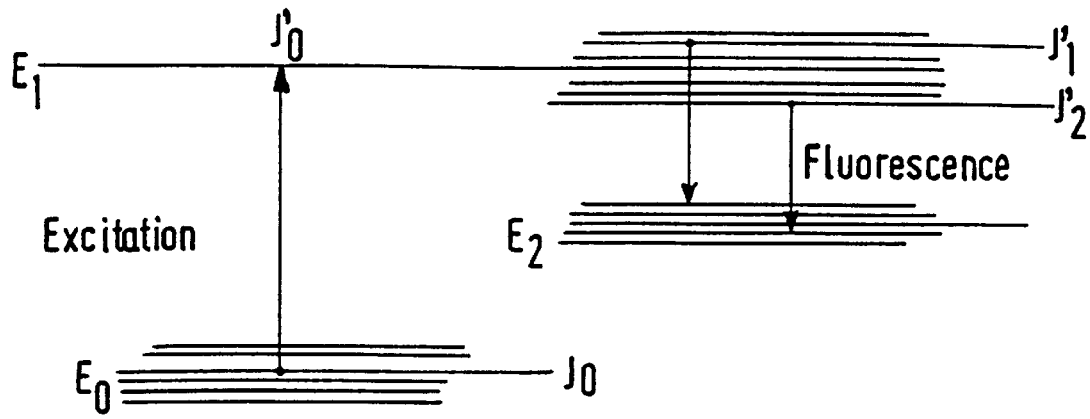
FIG. 1 graphically illustrates the principle of the invention.

FIG. 1 illustrates the general principle of the measurement.

The three energy levels $E_0$, $E_1$, $E_2$, such that $E_0 < E_2 < E_1$, are vibrational levels of the molecule in question, each corresponding to a value of the quantum number of vibration v. $E_0$ is the ground state. Each of these levels is divided into several close sub-levels each corresponding (for the purpose of simplification) to a value of the quantum number of rotation J.

The frequency of the excitation laser is supposedly centred on an absorption line corresponding to the vibrational transition $E_0$ ($J_0$)→$E_1$ ($J'_0$). The molecules at the initial level $E_0$ ($J_0$), which absorb a photon, pass to the level $E_1$ ($J'_0$); they will be distributed very quickly between the rotational sub-levels $E_1$ ($J'_1$), until thermal equilibrium given by the Boltzmann distribution. In fact, the probability of collisional transition between sub-levels is generally of the order of $10^{10}$ s$^{-1}$/bar, which leads to a maximum rotational relaxation time of 10 ns, for a minimum pressure of 10 mbar (at an altitude of 30 km).

A vibrational relaxation then occurs, i.e., the molecules excited at the sub-levels $E_1$ ($J'_1$) will drop back to lower vibrational levels (the most probable case), either after collision, or after spontaneous emission of a photon. This spontaneous emission phenomenon constitutes fluorescence.

For the infrared transitions of methane, the duration of fluorescence is determined by the vibrational relaxation due to the collisions between molecules. In fact, for pressures greater than 10 mbars, the probability of vibrational transition by radiation is clearly lower than the same probability by collision, the vibrational relaxation itself being much slower than the rotational relaxation seen previously. The result is that the fluorescence lasts only as long as there are molecules at the level $E_1$, the latter disappearing rapidly owing to the relaxation due to the collisions.

The level $E_2$ is chosen so that the probability of radiative transition $E_1 \to E_2$ is great (electric dipolar transition). One can then select two basic lines of the band ($E_1$, $E_2$), corresponding to two transitions starting from sub-levels $E_1$ ($J'_1$) and $E_1$ ($J'_2$) such that:

$$|E_1(J'_2) - E_1(J'_1)| > kT.$$

The ratio of the intensities of fluorescence of these two lines is equal to:

$$\frac{I_2}{I_1} = \frac{2J_2+1}{2J_1+1} \cdot \frac{P_2}{P_1} \cdot e^{-\frac{E_1(J'2)-E_1(J'1)}{kT}}$$

in which $P_1$ and $P_2$ are the two probabilities of spontaneous emission corresponding to the two lines of fluorescence in question. The ratio $P_2/P_1$ is close to 1 since the lines belong to the same band.

It is noted that the ratio $I_2/I_1$ depends solely on the temperature, since it has been assumed that the attenuations of the two fluorescence radiations are negligible or identical, which is generally the case since the band $E_1 \rightarrow E_2$ is a hot band.

Furthermore, as shown above, the vibrational relaxation by collision is much quicker than vibrational relaxation by radiation. In fact, for pressures greater than 10 mbars, the probability of vibrational transition by radiation is less than 100 $s^{-1}$ whereas the probability of vibrational transition by collision is between $10^5$ $s^{-1}$/bar and $10^7$ $s^{-1}$/bar.

The result is that the duration of fluorescence varies inversely with regard to the pressure, which makes it possible to measure the latter simply, at least if the time of decrease of fluorescence is not too short. In order to measure the pressure, one could thus use the duration of fluorescence on one of the chosen lines for measuring the temperature, for example by measuring the time necessary in order that the intensity of this line decreases by half.

The following considerations relate to the choice of the transitions used both by excitation and by fluorescence.

The structure of the energy levels of the methane molecule, $CH_4$, is very complex owing to the considerable number of vibration modes (4 modes) and their couplings.

With 5 nuclei in the molecule, there are in all 15 degrees of freedom; if one subtracts the 6 degrees of freedom of translation and rotation of the arrangement, there remain 9 degrees of freedom in vibration, which leads to the following modes of vibration:
1 non-degenerated mode of frequency $v_1$;
1 doubly degenerated mode of frequency $v_2$;
2 triply degenerated modes of frequencies $v_3$ and $v_4$.

Each vibrational sub-level is characterized by a tetrahedral type of symmetry noted as $A_1$, $A_2$, E, $F_1$, $F_2$.

The methane has an additional difficulty in the treatment of the vibration-rotation levels on account of peculiarities of the basic vibration frequencies.
We have: $v_1 \# v_3$ $v_2 \# v_4$ and:
$2v_2 \# 2v_4 \# v_1 \# v_3$
In fact, by supposing that $\tilde{v}=v/c$, in which c is the speed of light in a vacuum,
we have:
$\tilde{v}_1$=2916 $cm^{-1}$
$\tilde{v}_2$=1533 $cm^{-1}$
$\tilde{v}_3$=3019 $cm^{-1}$
$\tilde{v}_4$=1310 $cm^{-1}$
Thus from the time of the first excited vibrational states, one should consider groups of adjacent energy states, or polyades, whereof the vibrational sub-levels on the one hand and the vibro-rotational levels on the other hand, will be able to be strongly coupled if they have the same total symmetry. One then speaks of resonance or interacting states.

In the increasing order of the energy levels, above the fundamental vibrational state, one can distinguish between the dyade (group of 2 states $v_2$ and $v_4$), the pentade (5 states: $2v_4$, $2v_2$, $v_2+v_4$, $v_1$, $v_3$), the octade (8 states: $3v_4$, $2v_4+v_2$, $2v_2+v_4$, $3v_4$, etc . . . ), the tetradecade comprising 14 states whereof the level is $2v_3$ etc . . .

Given the very low concentration of methane in the atmosphere, only the intense transitions, thus of an electric dipolar nature, can be used.

As regards the excitation from the ground level $0(A_1)$, the harmonic band $2v_3$ is the most interesting, owing to the possibility of fluorescence $2v_3 \rightarrow v_3$, knowing that the transition $\Delta v_3$=+1 is the most intense. The existence of the erbium—YAG laser beam at 6060 cm-1 ($\lambda$=1.65 $\mu$m), within the band $2v_3$, is also an interesting factor.

The lines of the band $2v_3$ are perfectly observable in atmospheric spectra recorded from the ground, using the sun as a source, in the region 1.6 $\mu$m–1.7 $\mu$m. An atlas of the solar spectrum recorded from the Kitt Peak Observatory by high resolution Fourier spectrometry makes it possible to locate the lines of $CH_4$ at the centre of the lines of $CO_2$ and $H_2O$ [Photometric atlas of the solar spectrum from 1850 to 10,000 cm–1, Institut d'astrophysique de Liège (Liège Astrophysics Institute), Kitt Peak National Observatory (1982), L. DELBOUILLE et al].

Figures 2A, 2B:
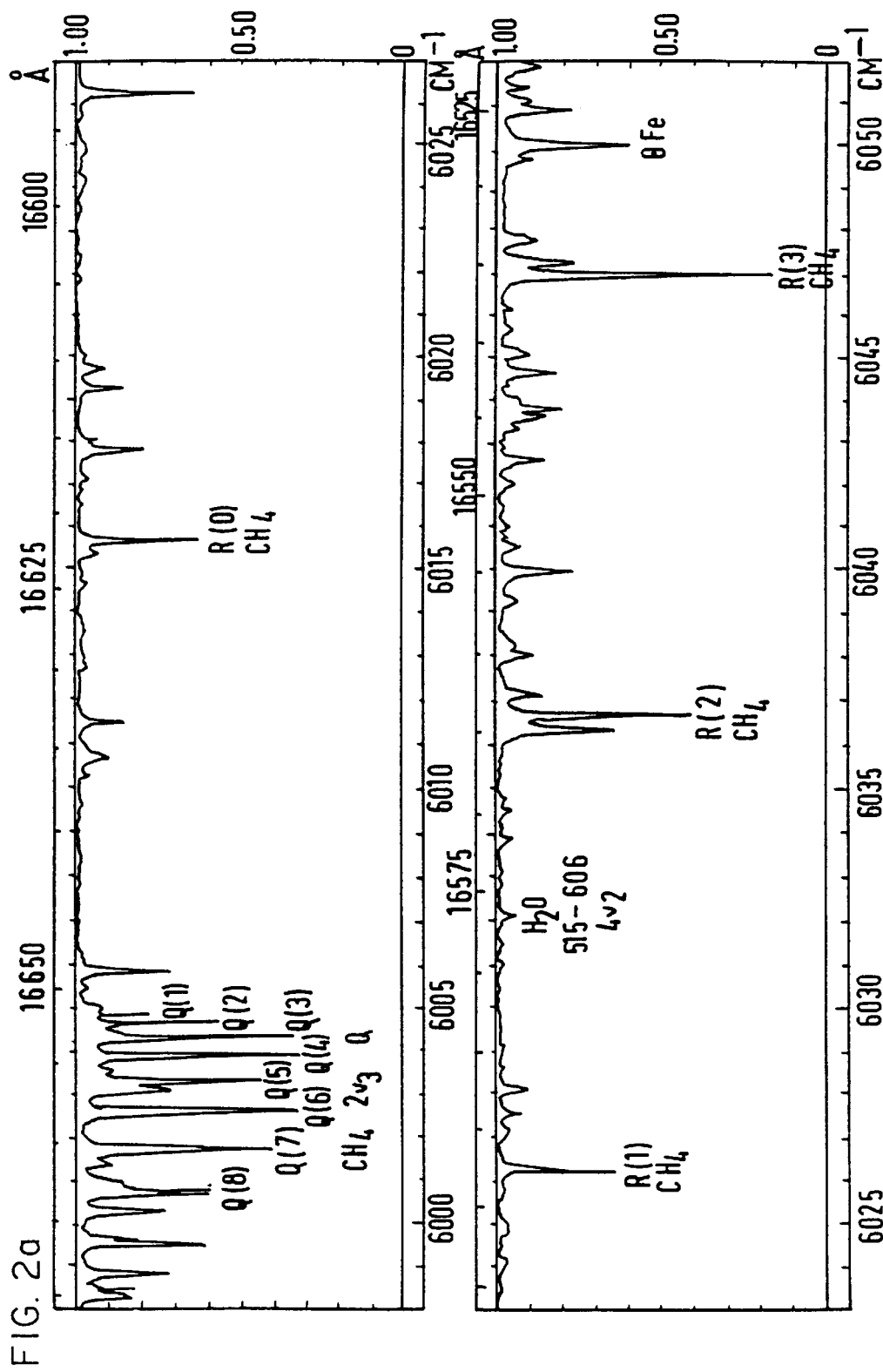
FIGS. 2a–2d are extract from an atlas of the solar spectrum.
Figures 2C, 2D:
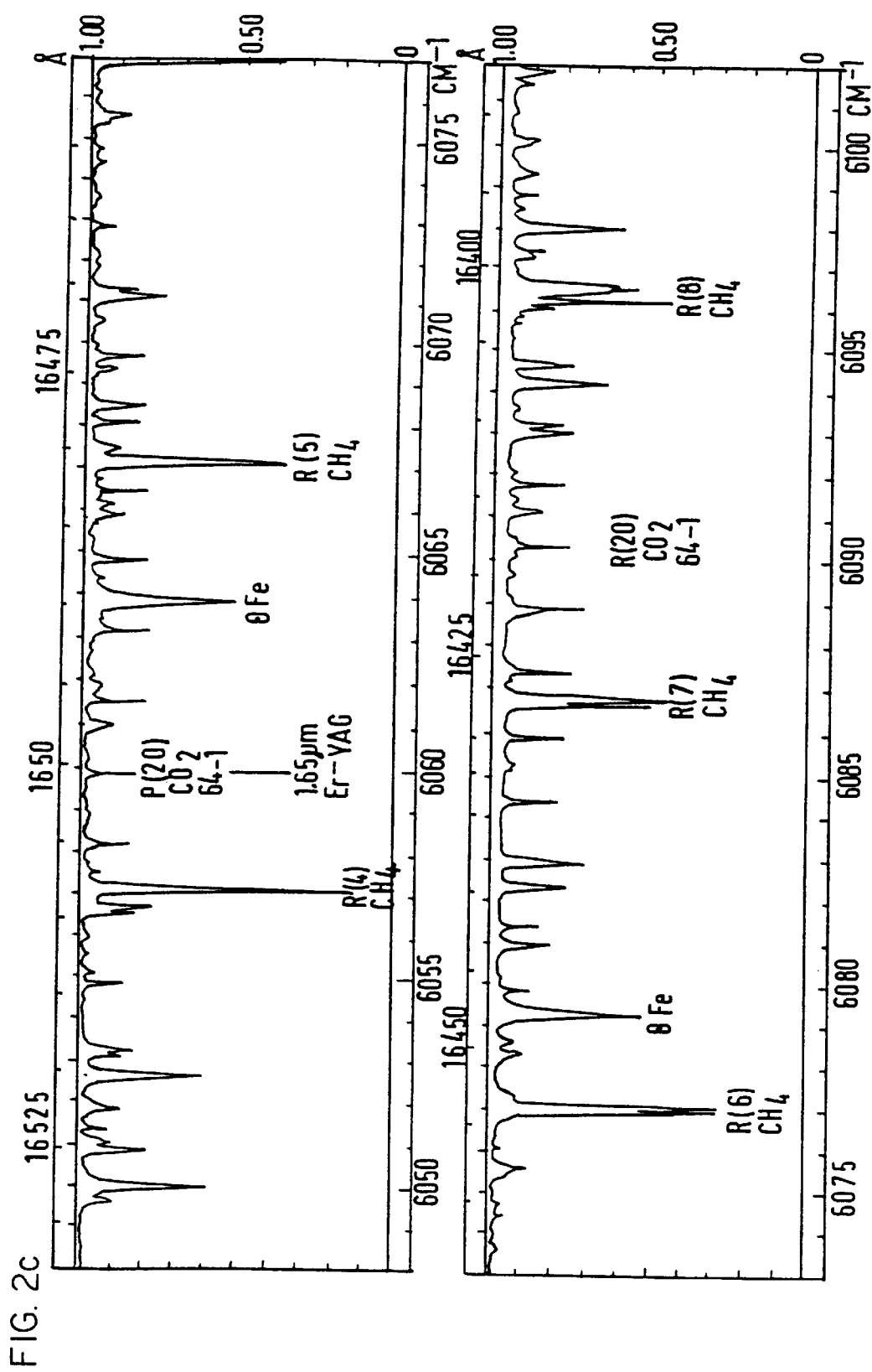

FIGS. 2a and 2b constitute an extract from this atlas in the region 6000 $cm^{-1}$–6100 $cm^{-1}$; this extract contains the branch Q of the band $2v_3$ of methane, as well as the lines (R(0) to R(8)) of the branch R. It will be noted that the most intense absorption line is the closest to the emission maximum of the Er—YAG laser; it is the line R(4) centred at 6057 $cm^{-1}$, which in reality is a multiplet whereof the total intensity is equal to $3.9 \times 10^{-21}$ $cm^2 \cdot cm^{-1}$.

The most effective excitation then consists of using a multiplet like the line R(4), with a laser whereof the band width is less than the mid-height width of the line. It is at high altitude that the line is the finest, since the widening is due solely to the Doppler effect of thermal agitation. The Doppler half-width at mid-height is:

$$\gamma_D = \left( \frac{2kT}{m} \cdot \text{Log}2 \right)^{\frac{1}{2}} \frac{\tilde{v}_o}{c}$$

with
$v_o$=6057 $cm^{-1}$
T=220K $$m = \frac{16}{6,022 \times 10^{23}} g$$

One obtains: $\gamma_D \approx 8 \times 10^{-3}$ $cm^{-1}$

It therefore requires a laser whereof the band width is less than 0.01 $cm^{-1}$ which corresponds to 300 MHz. On the other hand, in the case of frontal sighting for an aircraft flying at 400 m/s, the laser frequency is shifted by a Doppler half-width in the reference linked with the air; it is therefore necessary to carry out, at least at high altitude, a frequency correction proportional to the air speed of the aircraft.

Another possibility, less effective for absorption, but which would be suitable for a wide band laser (#7 $cm^{-1}$), would be to use the branch Q which extends between 5998 and 6005 $cm^{-1}$ (namely 1,665 $\mu$m–1,667 $\mu$m). One advantage of this solution would be more overall pumping of sub-level $2v_3$ (F2), which would facilitate the transfer by collisions to the other sub-levels $2v_3$ (A1) and $2v_3$ (E). One would thus increase the possibilities of choice for the lines of fluorescence.

The level 2v3 is divided into three sub-levels of different symmetries:

$2\nu_3$ (A1) at 5968 cm$^{-1}$
$2\nu_3$ (F2) at 6005 cm$^{-1}$
$2\nu_3$ (E) at 6044 cm$^{-1}$.

In excitation, only the band O(A1)→$2\nu_3$ (F2) is active. For the fluorescence, the three components:
$2\nu_3$ (F2)→$\nu_3$(F2),
$2\nu_3$ (A1)→$\nu_3$(F2),
$2\nu_3$(E)→$\nu_3$(F2),
corresponding to $\Delta\nu_3=-1$ will be active in the infrared range. One can admit in a first approach that the relative intensities of fluorescence in these bands are of the same order as that of the fundamental band $\nu_3$(F2)→O(A1).

On the basis of this hypothesis, and if one considers on the other hand the statistical weights of the 3 sub-levels (3 for $F_2$, 2 for E and 1 for $A_1$), one can state that the most interesting fluorescence band is the band $2\nu_3(F_2)$→$\nu_3(F_2)$, and this is for two reasons:
the excitation brings the molecules to the sub-level $2\nu_3(F_2)$
if the relaxation between the three sub-levels is rapid, the sub-level $F_2$ has the greatest statistical weight and the fluorescence output will be better from $F_2$. In this respect the low separation of the three levels relative to kT should be noted:

$kT/hc \approx 206$ cm$^{-1}$ at 296K

Figure 3:
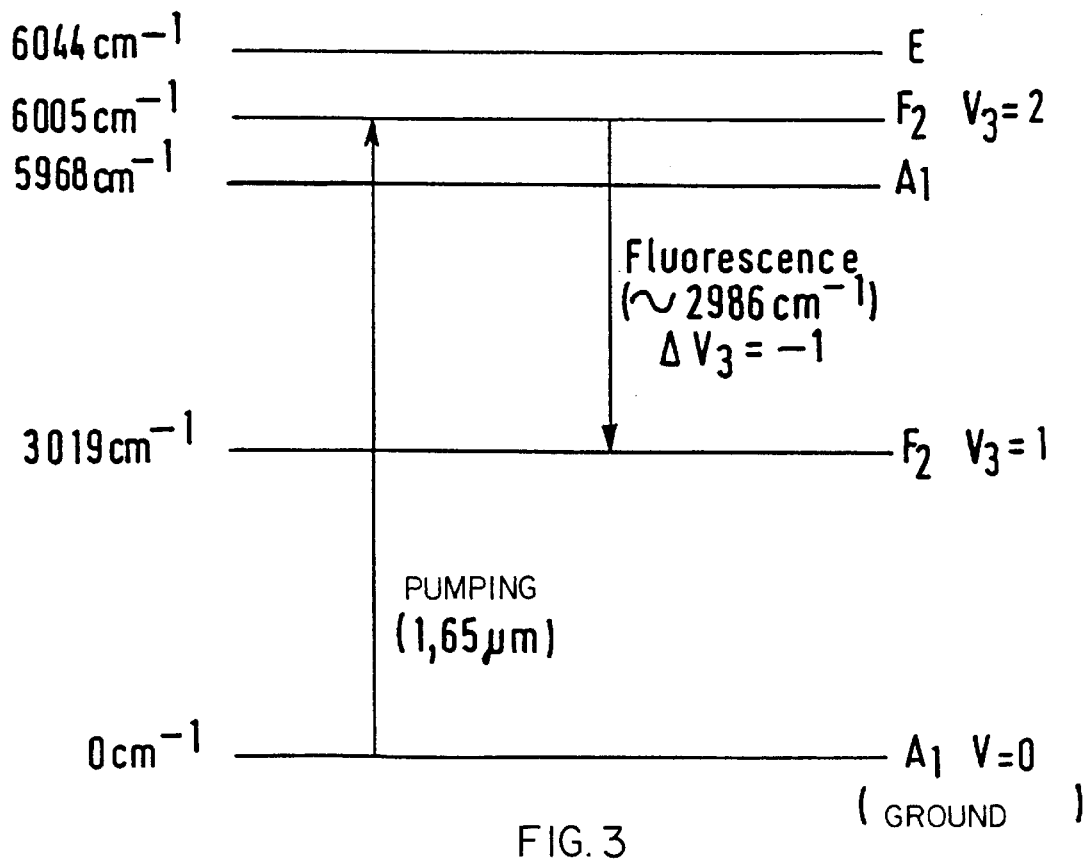
FIG. 3 graphically illustrates the method according to the present invention.

One could thus adopt the excitation-fluorescence diagram of FIG. 3.

Figure 4:
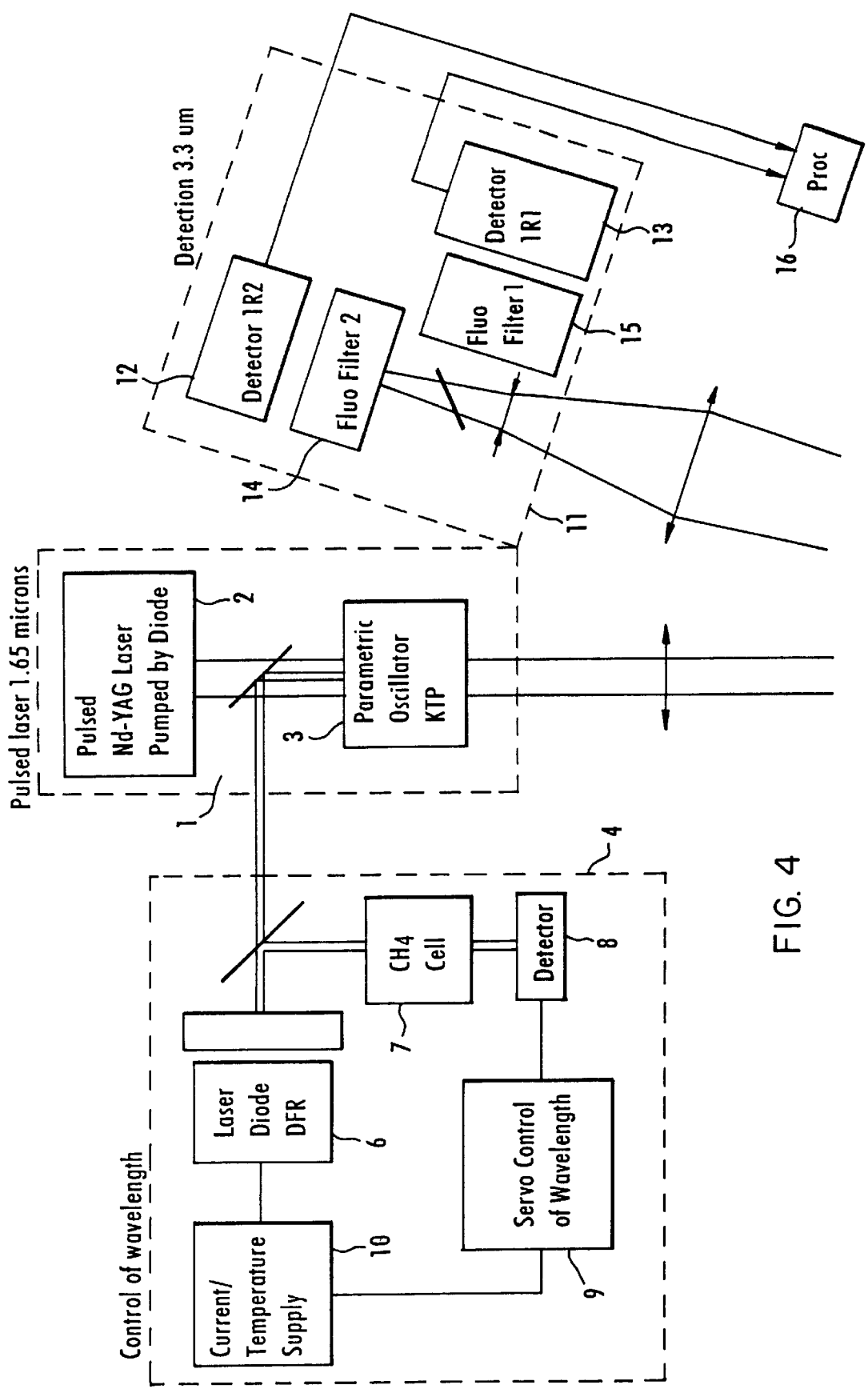
FIG. 4 is a diagrammatic illustration of an apparatus according to the present invention.

FIG. 4 shows one embodiment of an optical apparatus allowing the implementation of the method according to the invention.

The source used for the excitation of the methane molecules is in this case constituted by a pulsed laser able to be tuned accurately to one line of the absorption spectrum of methane which, as has been seen previously, is situated at approximately 1.65 microns. This laser 1 is formed by a neodymium-YAG laser 2 itself pumped by a laser diode, and by an optical parametric oscillator (OPO) 3. By angular tuning, the OPO cavity makes it possible to obtain a source in the solid state which can be tuned as regards its frequency over a very wide spectral range. The accessibility to each of the lines of methane is thus guaranteed.

A KTP crystal is used in this case in the oscillator 3, which crystal is advantageous on account of non-critical phase tuning in the vicinity of 1.65 microns. This has the advantage of a finer line and a low threshold.

The control of the wavelength of the beam emitted by the laser 1 is ensured by means of a control unit 4.

This unit comprises a DFB laser diode whereof part of the output beam is injected into the optical parametric oscillator 3 and whereof the other part serves to excite the molecules of a cell 7 of methane. An optical detector 8 is placed behind the cell 7, its output being applied as an input to a servo control 9 of known type for controlling the wavelength of the beam coming from the diode 6. The output of the servo control 9 controls the electrical supply circuit 10 of the laser diode 6.

As has been mentioned above, it can also be envisaged, as a variation, to use an erbium-crystal laser. In fact, in a crystalline matrix, the erbium ion has a transition in the vicinity of 1.65 $\mu$m:

$^4I_{13/2}$→$^4I_{15/2}$

Pumping may be carried out by a laser diode with Ytterbium doping which has an absorption towards 950 $\mu$m.

In all cases, the detection is ensured by means of a unit 11 comprising two infrared detectors 12 and 13 placed behind filters 14 and 15 respectively.

The filters 14 and 15 are very narrow spectral filters in order to sufficiently lower the parasite solar flux. As detectors one can use InSb photodiodes cooled with liquid nitrogen. Furthermore, all the directly facing surfaces of the detectors 12 and 13, as well as the filters are also cooled to the temperature of liquid nitrogen.

The outputs of the detectors 12 and 13 are applied as an input to a processor 16 ensuring the digitization of the signals and the calculation of the temperature and of the pressure. As regards the temperature, the detection currents recorded on the detectors 12 and 13 and each corresponding to one of the chosen fluorescence lines are integrated.

This integration is effected during a period $\tau=1/Q$ equal to the time constant of the decrease of fluorescence. The value of $\tau$ is previously determined by sampling a fluorescence pulse; one can then find the average of the charge measurements $Q_1$ and $Q_2$ at the time of ten successive firings.

The temperature is deduced from the ratio $Q_2/Q_1$.

As regards the measurement of the pressure, it will be recalled that the latter is inversely proportional to the duration of fluorescence. One could thus measure the intensity of one of the lines chosen for the temperature and take as the duration of fluorescence the time of decrease of this intensity between two reference values, for example by taking into account a decrease of the intensity by half.

I claim:

1. A method for optically determining the temperature of a gaseous mixture, which method comprises:

exciting, in the infrared range, the molecules of a gas of said mixture, from a first vibrational level to a second vibrational level;

allowing the rotational relaxation of said molecules between the different rotational sub-levels of said second vibrational level;

measuring the ratio of the populations of molecules located at two of said rotational sub-levels; and deducing from said ratio the temperature of the gaseous mixture.

2. The method according to claim 1, in which said gaseous mixture is air and said gas is methane.

3. The method according to claim 2, in which said first vibrational level is the ground level and the molecules of methane are excited towards the second vibrational level $2\nu_3$.

4. The method according to claim 3, in which the molecules of methane are excited in the band O($A_1$)→$2\nu_3$ (F2), wherein:

O is the ground level;

$A_1$ is the rotational sub-level at ground level;

$2\nu_3$ is the second vibrational level having a O branch and an R branch; and

F2 is one of the two rotational sub-levels of the second vibrational level.

5. The method according to claim 4, in which the molecules of methane are excited in the line R(4) of the R branch of the band $2\nu_3$.

6. The method according to claim 4, in which the molecules of methane are excited in the branch Q of the band $2\nu_3$.

7. The method according to claim 1, in which, with a view to measuring the ratio of the populations of molecules located at said two rotational sub-levels, one measures the ratio of the intensities of fluorescence of two lines of the emission spectrum of said gas from said two rotational sub-levels towards two other rotational sub-levels of a third vibrational level.

8. The method according to claim 7, in which said third vibrational level is the level $v_3$.

9. The method according to claim 8, utilizing said two lines of fluorescence in the band $2v_3$ (F2)→$v_3$ (F2), wherein, $v_3$ is the second vibrational level having a Q branch and an R branch; and F2 is one of the two rotational sub-levels of the second vibrational level.

10. A method for the optical determination of the temperature of a gaseous mixture, comprising:

measuring the ratio of intensity of fluorescence of two lines of the emission spectrum of a gas of said mixture, whereof the molecules of the gaseous mixture have previously been excited in the infrared range at two different energy states;

deducing from this ratio the ratio of the populations of said states; and deducing said temperature from said ratio of populations.

11. The method according to claim 10, in which said gaseous mixture is air and said gas is methane.

12. The method according to claim 10, in which said two energy states correspond to two rotational sub-levels of a vibrational level of the molecules of said gas.

13. The method according to claim 12, in which said two rotational sub-levels belong to a vibrational level $2v_3$.

14. The method according to claim 13, in which said two lines of fluorescence are in the band $2v_3$ (F2)→$v_3$ (F2), wherein:

$2v_3$ is a higher energy vibrational level; and

F2 is a rotational sub-level; and $v_3$ is a lower energy vibrational level.

15. An apparatus for optically measuring the temperature of a gaseous mixture, which apparatus comprises:

a laser able to excite the molecules of a gas of said mixture in the infrared range from a first to a second vibrational level and allowing rotational relaxation of molecules between different rotational sub-levels;

detection means for measuring the intensity of fluorescence of two lines of the emission spectrum of said gas from two rotational sub-levels of said second vibrational level;

means for deducing a ratio of populations of different energy states from a ratio of the intensities;

and calculation means for determining said temperature from said ratio of populations.

16. The apparatus according to claim 15, in which said calculation means are arranged in order to integrate the detection currents produced in the detection means associated with each of said lines, in order to calculate the ratio of the charges corresponding to each of said currents and in order to deduce the temperature from said ratio.

* * * * *